(12) United States Patent
Chie

(10) Patent No.: US 9,002,409 B2
(45) Date of Patent: Apr. 7, 2015

(54) METHOD OF PROCESSING RADIO FREQUENCY SIGNAL IN MOBILE TERMINAL, AND MOBILE COMMUNICATION SYSTEM AND MOBILE TERMINAL USING THE SAME

(75) Inventor: Sung Kyu Chie, Seoul (KR)

(73) Assignee: LG Electronics Inc., Seoul (KR)

( * ) Notice: Subject to any disclaimer, the term of this patent is extended or adjusted under 35 U.S.C. 154(b) by 1354 days.

(21) Appl. No.: 11/625,270

(22) Filed: Jan. 19, 2007

(65) Prior Publication Data
US 2007/0173284 A1 Jul. 26, 2007

(30) Foreign Application Priority Data
Jan. 20, 2006 (KR) .................. 10-2006-0006493

(51) Int. Cl.
*H04B 1/38* (2006.01)
*H04M 1/725* (2006.01)
*H04L 12/58* (2006.01)
*H04M 1/663* (2006.01)
*H04M 3/42* (2006.01)
*H04M 1/64* (2006.01)

(52) U.S. Cl.
CPC ......... *H04M 1/72547* (2013.01); *H04L 12/581* (2013.01); *H04L 12/5895* (2013.01); *H04L 51/04* (2013.01); *H04L 51/38* (2013.01); *H04M 1/663* (2013.01); *H04M 3/42365* (2013.01); *H04M 1/642* (2013.01)

(58) Field of Classification Search
CPC ........ G06Q 50/01; H04L 51/04; H04L 51/32; H04L 67/42; H04L 51/12; H04L 67/26; H04L 12/581; H04L 51/043; H04L 67/24; H04L 12/587; H04L 29/06; H04L 51/046; H04L 12/5895; H04L 41/026; H04L 12/1818; H04L 12/1822; H04L 12/585; H04L 12/588; H04L 12/589; H04N 21/258; H04N 21/4882; H04W 12/06; H04W 72/04
USPC ............... 370/310, 432, 329, 352; 455/412.1, 455/412.2, 435.1, 411, 415, 418, 414.1, 455/556.1, 567, 413, 458, 417, 466; 709/207, 206, 204, 224, 201, 203; 707/6; 379/201.01, 106.09, 201.02, 379/373.01; 715/758, 752, 756
See application file for complete search history.

(56) References Cited

U.S. PATENT DOCUMENTS

2003/0236086 A1 12/2003 Litwin, Jr.
2004/0162881 A1 8/2004 Digate et al.
2005/0223075 A1* 10/2005 Swearingen et al. ......... 709/207

(Continued)

FOREIGN PATENT DOCUMENTS

CN 1460215 12/2003

(Continued)

*Primary Examiner* — Fred Casca
(74) *Attorney, Agent, or Firm* — Lee, Hong, Degerman, Kang & Waimey

(57) ABSTRACT

A mobile terminal adapted to process a received call signal or message signal by mapping a response mode corresponding to present user status information and a method thereof are provided. The method includes confirming user status information in the mobile terminal according to the received radio frequency signal, mapping a response mode corresponding to the confirmed user status information, and processing the radio frequency signal according to the mapped response mode.

6 Claims, 4 Drawing Sheets

(56) References Cited

U.S. PATENT DOCUMENTS

| | | | |
|---|---|---|---|
| 2006/0026254 A1* | 2/2006 | Kessen et al. | 709/207 |
| 2006/0056386 A1* | 3/2006 | Stogel | 370/351 |
| 2006/0212519 A1* | 9/2006 | Kelley et al. | 709/206 |
| 2007/0058653 A1* | 3/2007 | Harris et al. | 370/432 |

FOREIGN PATENT DOCUMENTS

| | | |
|---|---|---|
| CN | 1620045 | 5/2005 |
| JP | 2002077975 | 3/2002 |
| JP | 2003115795 | 4/2003 |
| JP | 2004328309 | 11/2004 |
| JP | 2005197821 | 7/2005 |
| JP | 2005530403 | 10/2005 |
| JP | 2005531228 | 10/2005 |
| KR | 10-2005-0010242 | 1/2005 |
| KR | 10-2006-0002258 | 1/2006 |
| WO | 2004/028171 | 4/2004 |

* cited by examiner

METHOD OF PROCESSING RADIO FREQUENCY SIGNAL IN MOBILE TERMINAL, AND MOBILE COMMUNICATION SYSTEM AND MOBILE TERMINAL USING THE SAME

This application claims the priority benefit of Korean Patent Application No. 10-2006-0006493, filed on Jan. 20, 2006, which is hereby incorporated by reference as if fully set forth herein.

FIELD OF THE INVENTION

The present invention is directed to a mobile terminal, and more particularly, to method of processing a radio frequency in a mobile terminal, and a mobile communication system and a mobile terminal using the same.

DESCRIPTION OF THE RELATED ART

Recently, as the number of people using the Internet has rapidly increased, a variety of Internet services have been developed and provided. Among them, an instant messaging service is an Internet communication service for performing real time text communication, voice communication, or video communication between users using the instant messaging service.

Recently, a mobile instant messaging service by which the instant messaging service is applied to a mobile communication system has been provided. As the instant messaging service is used, users are provided with the present status of other users using the instant messaging service in real time.

The mobile terminal performs login during which an ID and a password provided by a server managing the instant messaging service are input. When the login is performed, the mobile terminal receives a list of other users connected for the use of the instant messaging service from the server. The mobile terminal displays information about the users contained in the list.

The status information about the users using the instant messaging service will be described with reference to FIG. 1. As illustrated in FIG. 1, the status information is roughly divided into an 'on-line' status 110 and an 'off-line' status 120.

The user status information in the 'on-line' status 110 is displayed by a 'conversation enable' status 112, a 'busy' status 114, and an 'empty' status 116. The user status information in the 'off-line' status 120 is displayed by a status 122 displayed as either 'set as off-line' status or 'off-line' status 124 according to a user's choice.

However, according to the related art as described above, even if a real present status of the user is taken into consideration when setting the user status, only the operation related to the instant messaging service is affected, but a receiving operation of a call or a message signal is not affected. Therefore, even when the user status is the empty or the off-line status, the mobile terminal must normally receive call signals or message signals regardless of the user status.

SUMMARY OF THE INVENTION

One object of the present invention is to provide a mobile terminal to process a radio frequency (RF) signal corresponding to user status information and a method thereof. Another object of the present invention is to provide a mobile terminal to map a response mode with respect to a radio frequency signal in response to user status information and a method thereof. Still another object of the present invention is to provide a mobile terminal to set a response mode with respect to a radio frequency signal according to user status information set by an instant messaging service when the instant messaging service is implemented using the mobile terminal, and a method thereof.

In one aspect of the present invention, a method of processing a radio frequency (RF) signal in a mobile terminal is provided. The method includes receiving the RF signal, confirming user status information according to the received RF signal, mapping a response mode corresponding to the confirmed user status information and processing the RF signal according to the mapped response mode.

It is contemplated that the RF signal is at least one of a call signal and a message signal. It is further contemplated that the method includes setting the user status information in the mobile terminal.

It is contemplated that the method includes determining whether an instant messaging service function is used and registering the user status information with one of an external instant messaging service server and a signal managing server according to a result of the determination. It is further contemplated that the method includes confirming caller information corresponding to the RF signal and processing the RF signal independently from the user status information if the caller information is related to a specific caller.

It is contemplated that a no response mode is mapped and the RF signal is processed as if the mobile terminal is unable to respond when the user status information indicates an 'empty' status. It is further contemplated that a call unable response mode is mapped and the RF signal is processed as if the mobile terminal is unable to connect a call when the user status information indicates a 'busy' status. Preferably, an off-line response mode is mapped and the RF signal is processed as if the mobile terminal is powered off when the user status information indicates a 'set as off-line' status.

In another aspect of the present invention, a method of processing a radio frequency (RF) signal in a communication system is provided. The method includes a mobile terminal registering user status information with an instant messaging service server, the instant messaging service server sharing the registered user status information with a signal managing server, the mobile terminal receiving the RF signal from the signal managing server and the mobile terminal processing the RF signal according to the registered user status information.

It is contemplated that the method includes the mobile terminal registering the user status information with the signal managing server when the mobile terminal does not use an instant messaging service function.

In another aspect of the present invention, a mobile terminal adapted to process a radio frequency (RE) signal is provided. The mobile terminal includes a status setting module adapted to set user status information, a transceiver adapted to receive the RF signal and a controller adapted to map a response mode corresponding to the user status information and output a control signal for processing the RF signal according to the mapped response mode.

It is contemplated that the status setting module is further adapted to register the user status information with at least one of an external instant messaging service server and a signal managing server. It is further contemplated that the controller includes a mapping module adapted to map the response mode corresponding to the user status information.

It is contemplated that the mobile terminal further includes a signal processor adapted to process the RF signal according to the control signal. It is further contemplated that the controller is further adapted to output a control signal for mapping a no response mode when the user status information indicates an 'empty' status and process the RF signal as if the mobile terminal cannot respond to the RF signal.

It is contemplated that the controller is further adapted to output a control signal for mapping a call unable response mode when the user status information indicates a 'busy' status and process the RF signal as if the mobile terminal is unable to connect a call. It is further contemplated that the controller is further adapted to output a control signal for mapping an off-line response mode when the user status information indicates a 'set as off-line' status and process the RF signal as if the mobile terminal is powered off.

In another aspect of the present invention, a communication system adapted to process a radio frequency (RF) signal is provided. The system includes a mobile terminal adapted to transmit user status information and process the RF signal according to the user status information, an instant messaging service server adapted to register and manage the user status information received from the mobile terminal and a signal managing server adapted to share the user status information registered with the instant messaging service server and manage the RF signal transmitted to the mobile terminal for processing according to the user status information.

It is contemplated that the mobile terminal is further adapted to transmit the user status information to the signal managing server when an instant messaging service function is not used. It is further contemplated that the mobile terminal is further adapted to map a response mode corresponding to the user status information.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
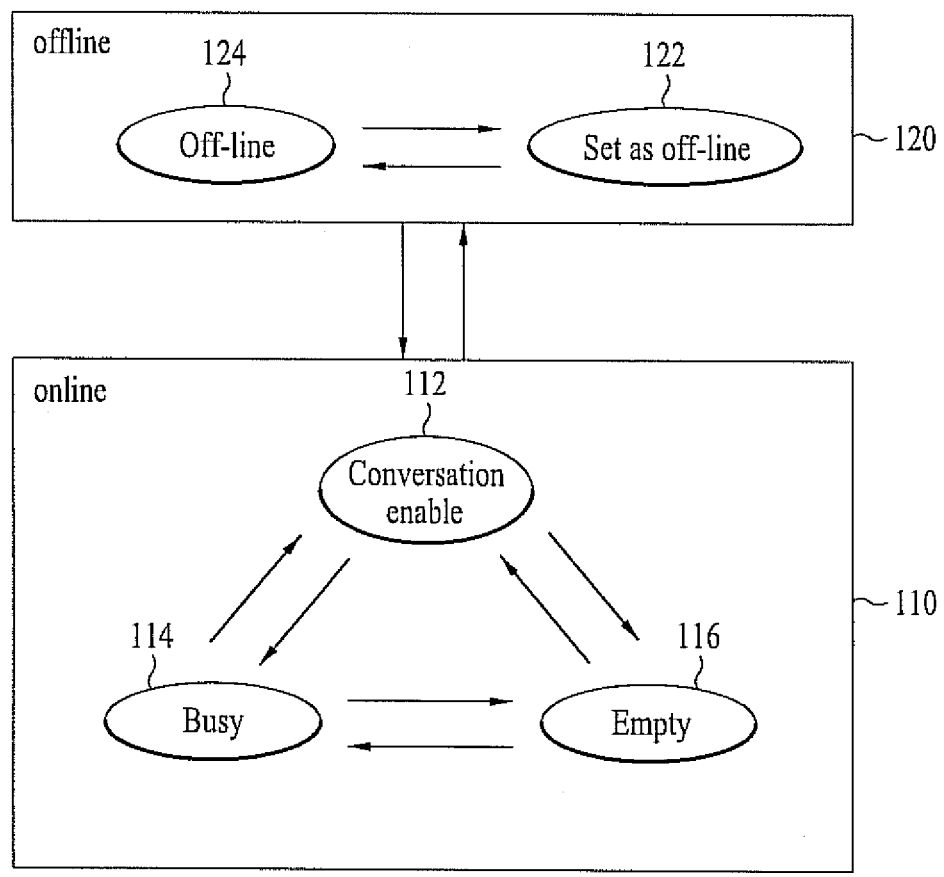
FIG. 1 illustrates an example of user status information according to a related art.
Figure 2:
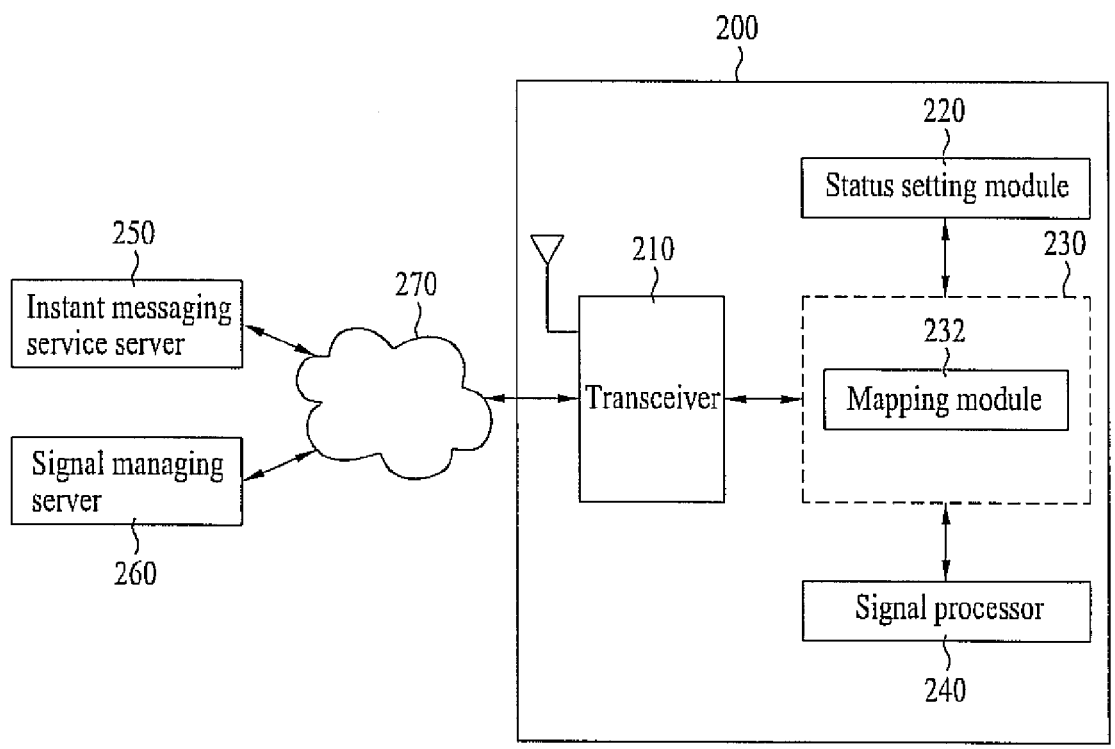
FIG. 2 illustrates a block diagram of a mobile terminal having a radio frequency signal processing function and a communication system according to an embodiment of the present invention.

Reference will now be made in detail to the preferred embodiments of the present invention, examples of which are illustrated in the accompanying drawings. In the description, the detailed description of well-known structures and operations will be omitted in order to avoid confusing the subject matter of the present invention A mobile terminal 200 having a radio frequency (RF) signal processing function according to the present invention and a communication system will be described in detail with reference to FIG. 2. As illustrated in FIG. 2, the mobile terminal 200 includes a transceiver 210 transmitting and receiving an RF signal, a status setting module 220 setting user status information, a controller 230 outputting a control signal for processing an RF signal in response to the user status information, and a signal processor 240 processing the RF signal according to the control signal.

As further illustrated in FIG. 2, the communication system includes an instant messaging service server 250 registering and managing the user status information received from the mobile terminal 200, and a signal managing server 260 sharing the user status information registered with the instant messaging service server 250 and managing the RF signal transmitted to the mobile terminal 200 such that it is processed according to the user status information. The mobile terminal 200 transmits the user status information to the instant messaging service server 250 or the signal managing server 260 and processes the RF signal according to the user status information.

As illustrated, the instant messaging service server 250 is an instant messenger providing system, hereinafter referred to as 'IMPS'. The signal managing server 260 may be a mobile switching center server.

The transceiver 210 transmits and receives the RF signal to and from the instant messaging service server 250 or the signal managing server 260.

For example, the transceiver 210 transmits the user status information set by the status setting module 220 to the instant messaging service server 250 or the signal managing server 260. The transceiver 210 further transmits and receives a call signal or a message signal to and from the signal managing server 260. The status setting module 220 sets the user status information by taking into consideration a present user status of the mobile terminal 200. For example, the status setting module 220 may set the user status information according to the status information input from the user. The status setting module 220 may set one of 'on-line', 'empty', 'busy', 'do not disturb', and 'set as off-line' as the user status information according to a user's selection.

The user status information is information related to a user status set automatically or by the user when the mobile terminal 200 implements the instant messaging service function. The status setting module 220 registers the user status information with the instant messaging service server 250 through the transceiver 210. The instant messaging service server 250 shares the registered user status information with the signal managing server 260.

The user status information may be set regardless of the use of the instant messaging service function. The status setting module 220 registers the set user status information with the signal managing server 260. In this way, the set user status information is registered with the instant messaging service server 250 or the signal managing server 260 for use in processing the RF signal.

The controller 230 maps a response mode corresponding to the user status information set by the status setting module 220 and outputs the control signal for use when processing an RF signal according to the mapped response mode. The controller 230 includes a mapping module 232 mapping the response mode corresponding to the user status information.

For example, when the user status information is set to 'empty' status, the mapping module 232 maps a no response mode. The no response mode is a mode in which a call signal or a message signal is processed as a missed call or an unconfirmed message without informing the user of the reception of the call signal or the message signal.

When the user status information is set to 'busy' status, the mapping module 232 maps a call unable response mode. The call unable response mode is a mode in which a received call signal is processed as a call unable status and a received message signal is received as an unconfirmed message.

When the user status information is set to 'set as off-line' status, the mapping module 232 maps an off-line response mode. The off-line response mode indicates a mode in which a received call is processed as a status when the mobile terminal 200 is powered off and a received message is processed as an unconfirmed message. The reason the user sets the 'set as off-line' status is because the user does not want to inform his/her status to the others.

When the user status information is set to 'on-line' status, the mapping module 232 maps a normal response mode. The normal response mode is a mode in which a received call or a received message is processed normally.

The signal processor 240 processes the RF signal according to the response mode mapped by the mapping module 232. For example, when the no response mode is mapped, the signal processor 240 does not inform the user that a call signal or message signal is received and processes the received call or the received message signal as a missed call or an unconfirmed message. Therefore, the user never knows that the call signal or the message signal is received and the signal managing server 260 continuously provides only a call connection beep to a caller attempting to connect a call.

When the call unable response mode is mapped, the signal processor 240 does not inform the user that a call signal or message signal is received and processes the mobile terminal 200 in a status of being unable to connect a call at the present time. Therefore, the user never knows that the call signal or the message signal is received and the signal managing server 260 can provide a guide message that the mobile terminal 200 is in a status of being unable to connect a call to the caller attempting to connect the call.

When the off-line response mode is mapped, the signal processor 240 does not inform the user that a call signal or message signal is received and processes the mobile terminal 200 in a status of being powered off at the present time. Therefore, the user never knows that the call signal or the message signal is received and the signal managing server 260 can provide a guide message, such as the mobile terminal 200 is now powered off, to the caller attempting to connect a call.

Although the mobile terminal 200 is silent or does not vibrate to indicate the received call signal or the received message signal, the signal processor 240 manages the call signal as a missed call and the message signal as a message that is received but not confirmed. When the normal response mode is mapped, the signal processor 240 informs the user that a call signal or message signal is received.

Figure 3:
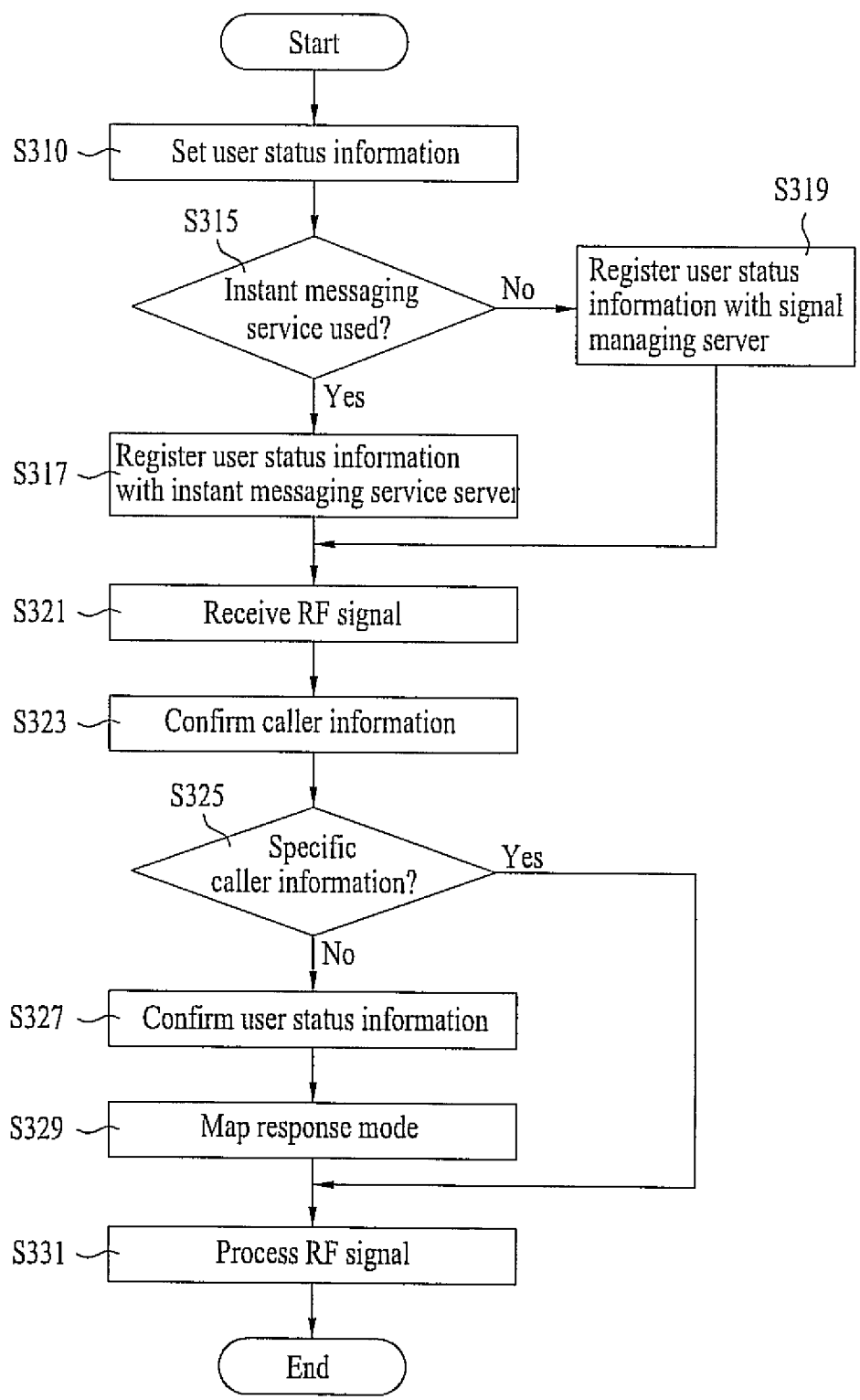
FIG. 3 is a flowchart illustrating a method of processing a radio frequency signal in a mobile terminal according to an embodiment of the present invention.

A method of processing an RF signal in a mobile terminal 200 according to an embodiment of the present invention will be described in detail with reference to FIG. 3.

The mobile terminal 200 sets user status information (S310). The mobile terminal 200 may set the user status information as one of an 'on-line' status, an 'empty' status, a 'busy' status, a 'do not disturb' status, and a 'set as off-line' status. The status may be set either automatically or according to a user's selection.

The mobile terminal 200 determines whether or not the instant messaging service function is used at the present time (S315).

The mobile terminal 200 registers the set user status information with the instant messaging service server 250 when the instant messaging service function is used (S317). The instant messaging service server 250 then shares the registered user status information with the signal managing server 260.

The mobile terminal 200 registers the set user status information with the signal managing server 260 when the instant messaging service function is not used (S319). Step S319 may be performed even when the instant messaging service function is used.

The mobile terminal 200 receives an RF signal and operates according to the normal response mode when the instant messaging service function is not used. In other words, the mobile terminal 200 connects a received call when the call is received and provides a received message directly to the user when the message is received. The mobile terminal 200 receives the RF signal from the signal managing server 260 through a wireless communication network 270 (S321).

The RF signal indicates either a call signal or message signal. The mobile terminal 200 confirms information about the caller sending the RF signal (S323) and determines whether or not the confirmed caller information is information about a specific caller (S325).

The mobile terminal 200 processes the RF signal according to a separate response mode set independently from the set user status information when the confirmed caller information is information about the specific caller. For example, the mobile terminal 200 processes the call signal or the message signal from the specific caller normally when the user sets the normal response mode to the specific caller. In other words, the mobile terminal 200 processes the RF signal from a specific caller independently from the set user status information when a call from the specific caller must be connected or a message from the specific caller must be confirmed.

Steps S323 and S325 are only necessary in a specific case and may be omitted in general operation according to the present invention.

The mobile terminal 200 confirms the set user status information when the confirmed caller information is not information about the specific caller (S327). The mobile terminal 200 then maps a response mode corresponding to the confirmed user status information (S329). The mobile terminal 200 processes the RF signal according to the mapped response mode (S331).

Figure 4:
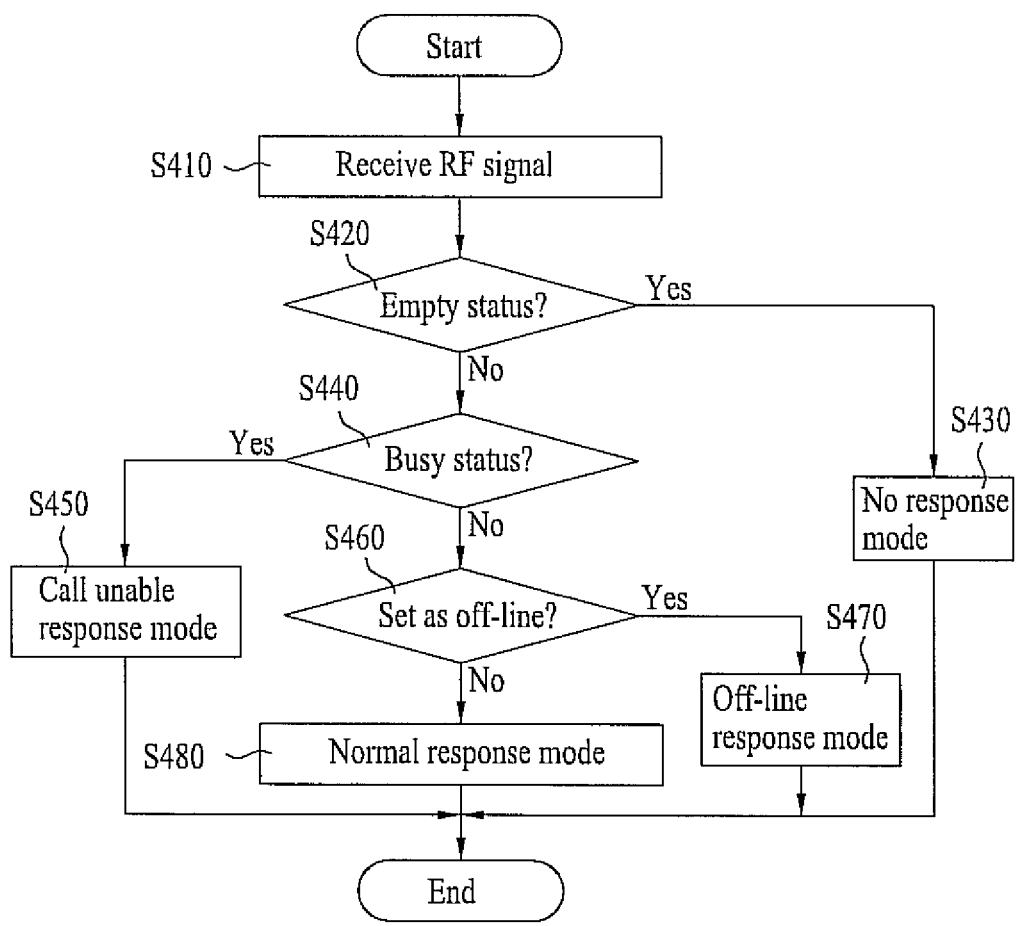
FIG. 4 is a flowchart illustrating a method of mapping a response mode in a mobile terminal according to an embodiment of the present invention.

A method of mapping the response mode will be described in detail with reference to FIG. 4.

The mobile terminal 200 maps the no response mode when the user status information is the 'empty' status, (S420 and S430). The no response mode is a mode that does not inform the user of the receipt of a call signal or message signal and processes the received call signal as a missed call or the received message signal as an unconfirmed message.

Therefore, the user never knows that a call signal or message signal was received. Furthermore, only a call connection beep is continuously provided to the caller attempting to connect a call.

The mobile terminal 200 maps the call unable response mode when the user status information is the 'busy' status (S440 and S450). The call unable response mode is a mode in which a received call signal is processed as the call unable status and a received message signal is processed as an unconfirmed message.

Therefore, the user never knows that a call signal or message signal is received. Furthermore, a guide message that the mobile terminal cannot be connected at the present time is provided to the caller attempting to connect a call.

The mobile terminal 200 maps the off-line response mode when the user status information is the 'set as off-line' status (S460 and S470). The off-line response mode is a mode in which a received call is processed as a status when the mobile terminal 200 is powered off and a received message is processed as an unconfirmed message.

The reason the user sets the 'set as off-line' status is because the user does not want to inform his/her status to others. Therefore, the user never knows that a call signal or message signal is received. Furthermore, a guide message that the mobile terminal is now powered off is provided to the caller attempting to connect a call.

Although the mobile terminal 200 is silent or does not vibrate to indicate receipt of a call signal or message signal according to the set user status information, the mobile terminal 200 manages a received call as a missed call and a received message as a message that is received but is not confirmed. Furthermore, when the mobile terminal 200 maps the normal response when the user status information is the 'on-line' status (S480).

The normal response mode is a mode in which a received call or received message is processed normally. Therefore, the mobile terminal 200 informs the user that a call or message is received normally.

According to the present invention, an RF signal can be properly processed according to the present status of the mobile terminal 200 since the RF signal is processed according to the response mode mapped in response to the user status information. Furthermore, the status information set in connection with the instant messaging service can be synchronized with real status information of a user using the mobile terminal 200 (200).

It will be apparent to those skilled in the art that various modifications and variations can be made in the present invention without departing from the spirit or scope of the inventions. Therefore, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of processing a voice call signal in a mobile terminal, the method comprising:

setting user status information for indicating a status of a plurality of different statuses for a user in an instant messaging service;

receiving the voice call signal when the instant messaging service is running on the mobile terminal;

checking whether caller information corresponding to the voice call signal is in a specific caller list;

outputting feedback informing that the voice call signal is received regardless of the set user status information when the caller information is in the specific caller list;

searching a voice call signal response mode mapped to the set user status information when the caller information is not in the specific caller list;

outputting the feedback in response to the received voice call signal when the searched voice call signal response mode represents a normal response mode; and processing the received voice call signal as a missed voice call when the searched voice call signal response mode represents a no response mode, a voice call unable response mode or an off-line response mode such that the feedback is not output in response to the received voice call signal, wherein the no response mode is selected when the user status indicates an 'empty' status; the voice call unable response mode is selected when the user status indicates a 'busy' status; and the off-line response mode is selected when the user status indicates an 'off-line' status, wherein the voice call signal is processed such that the mobile terminal is unable to respond in response to the selection of the no response mode, wherein the voice call signal is processed such that the mobile terminal is unable to connect to a caller in response to the selection of the voice call unable response mode, wherein the voice call signal is processed such that the mobile terminal is powered off in response to the selection of the off-line response mode, and wherein the user status information is registered to at least at least the instant messaging service server and the signal managing server even when the instant messaging service is not running on the mobile terminal.

2. A method of processing a voice call signal in a communication system, the method comprising:

registering, via a mobile terminal, user status information with an instant messaging service server, the user status information indicating a status of a plurality of different statuses for a user in an instant messaging service;

sharing, via the instant messaging service server, the registered user status information with a signal managing server;

receiving, via the mobile terminal, the voice call signal from a signal managing server when the instant messaging service is running on the mobile terminal;

checking, via the mobile terminal, whether caller information corresponding to the voice call signal is in a specific caller list;

outputting, via the mobile terminal, feedback informing that the voice call signal is received regardless of the set user status information when the caller information is in the specific caller list;

searching, via the mobile terminal, a voice call signal response mode mapped to the set user status information when the caller information is not in the specific caller list;

outputting, via the mobile terminal, the feedback in response to the received voice call signal when the searched voice call signal response mode represents a normal response mode; and processing, via the mobile terminal, the voice call signal as a missed voice call when the searched voice call signal response mode represents a no response mode, a voice call unable response mode or an off-line response mode such that the feedback is not output in response to the received voice call signal, wherein the no response mode is selected when the user status indicates an 'empty' status; the voice call unable response mode is selected when the user status indicates a 'busy' status; and the off-line response mode is selected when the user status indicates an 'off-line' status, wherein the voice call signal is processed such that the mobile terminal is unable to respond in response to the selection of the no response mode, wherein the voice call signal is processed such that the mobile terminal is unable to connect to a caller in response to the selection of the voice call unable response mode, wherein the voice call signal is processed such that the mobile terminal is powered off in response to the selection of the off-line response mode, and wherein the user status information is registered to at least the instant messaging service server and the signal managing server even when the instant messaging service is not running on the mobile terminal.

3. A mobile terminal configured to process a voice call signal, the mobile terminal comprising:
 a status setting module configured to set user status information for indicating a status of a plurality of different statuses for a user in an instant messaging service;
 a transceiver configured to receive the voice call signal; and
 a controller configured to:
 check whether caller information corresponding to the voice call signal is in a specific caller list when the voice call signal is received when the instant messaging service is running;
 cause output of feedback informing that the voice call signal is received regardless of the set user status information when the caller information is in the specific caller list;
 search a voice call signal response mode mapped to the user status information when the caller information is not in the specific caller list;
 cause output of the feedback in response to the received voice call signal when the searched voice call signal response mode represents a normal response mode; and
 process the voice call signal as a missed voice call when the searched voice call signal response mode represents a no response mode, a voice call unable response mode or an off-line response mode such that the feedback is not output in response to the received voice call signal,
 wherein the no response mode is selected when the user status indicates an 'empty' status; the voice call unable response mode is selected when the user status indicates a 'busy' status; and the off-line response mode is selected when the user status indicates an 'off-line' status, wherein the voice call signal is processed such that the mobile terminal is unable to respond in response to the selection of the no response mode, wherein the voice call signal is processed such that the mobile terminal is unable to connect to a caller in response to the selection of the voice call unable response mode, wherein the voice call signal is processed such that the mobile terminal is powered off in response to the selection of the off-line response mode, and wherein the user status information is registered to at least at least the instant messaging service server and the signal managing server even when the instant messaging service is not running on the mobile terminal.

4. The mobile terminal of claim 3, wherein the controller comprises a mapping module configured to map the voice call signal response mode corresponding to the set user status information.

5. The mobile terminal of claim 3, further comprising a signal processor configured to process the received voice call signal according to the mapped voice call signal response mode.

6. A communication system configured to process a voice call signal, the system comprising:
 a mobile terminal configured to set user status information and to transmit the set user status information;
 an instant messaging service server configured to register and manage the set user status information received from the mobile terminal; and
 a signal managing server configured to share the registered user status information with the instant messaging service server and manage the voice call signal transmitted to the mobile terminal,
 wherein the mobile terminal is further configured to:
 check whether caller information corresponding to the voice call signal is in a specific caller list when the mobile terminal receives the voice call signal from the signal managing server while the instant messaging service is running on the mobile terminal;
 output feedback informing that the voice call signal is received regardless of the set user status information when the caller information is in the specific caller list;
 search a voice call signal response mode mapped to the user status information when the caller information is not in the specific caller list, wherein:
 output the feedback in response to the received voice call signal when the searched voice call signal response mode represents a normal response mode; and
 process the voice call signal as a missed voice call when the searched voice call signal response mode represents a no response mode, a voice call unable response mode or an off-line response mode such that the feedback is not output,
 wherein the no response mode is selected when the user status indicates an 'empty' status; the voice call unable response mode is selected when the user status indicates a 'busy' status; and the off-line response mode is selected when the user status indicates an 'off-line' status,
 wherein the voice call signal is processed such that the mobile terminal is unable to respond in response to the selection of the no response mode, wherein the voice call signal is processed such that the mobile terminal is unable to connect to a caller in response to the selection of the voice call unable response mode, wherein the voice call signal is processed such that the mobile terminal is powered off in response to the selection of the off-line response mode, and wherein the user status information is registered to at least the instant messaging service server and the signal managing server even when the instant messaging service is not running on the mobile terminal.

\* \* \* \* \*